(12) United States Patent
Yap et al.

(10) Patent No.: US 9,335,568 B1
(45) Date of Patent: May 10, 2016

(54) ELECTRO-OPTIC GRATING MODULATOR

(75) Inventors: Daniel Yap, Oak Park, CA (US); Oleg M. Efimov, Thousand Oaks, CA (US); James H. Schaffner, Chatsworth, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1086 days.

(21) Appl. No.: 13/151,510

(22) Filed: Jun. 2, 2011

(51) Int. Cl.
*G02F 1/01* (2006.01)
*G02F 1/035* (2006.01)
*G02F 1/065* (2006.01)

(52) U.S. Cl.
CPC .............. *G02F 1/011* (2013.01); *G02F 1/0356* (2013.01); *G02F 1/065* (2013.01)

(58) Field of Classification Search
None
See application file for complete search history.

(56) References Cited

U.S. PATENT DOCUMENTS

| | | |
|---|---|---|
| 3,417,400 A | 12/1968 | Black |
| 3,735,293 A | 5/1973 | Breitenbach |
| 3,781,725 A | 12/1973 | Yoshida |
| 3,909,757 A | 9/1975 | Miyamoto |
| 4,129,841 A | 12/1978 | Hildebrand |
| 4,152,648 A | 5/1979 | Delogne |
| 4,339,733 A | 7/1982 | Smith |
| 4,376,941 A | 3/1983 | Zenel |
| 4,541,120 A | 9/1985 | Szabo |
| 4,987,394 A | 1/1991 | Harman |
| 5,015,052 A | 5/1991 | Ridgway |
| 5,076,622 A | 12/1991 | Detweiler |
| 5,076,655 A | 12/1991 | Bridges |
| 5,247,270 A | 9/1993 | Harman |
| 5,291,565 A | 3/1994 | Schaffner et al. |
| 5,309,531 A | 5/1994 | Sheehy |
| 5,517,199 A | 5/1996 | DiMattei |
| 5,519,408 A | 5/1996 | Schnetzer |
| 5,703,706 A | 12/1997 | Eckstein et al. |
| 5,751,867 A | 5/1998 | Schaffner |
| 5,936,203 A | 8/1999 | Ryman |

(Continued)

FOREIGN PATENT DOCUMENTS

FR 2661256 10/1991

OTHER PUBLICATIONS

Khurgin et al., "Ultrabroad-bandwidth electro-optic modulator based on a cascaded Bragg grating", Optics Letters, Optical Society of America, Washington, DC, vol. 25, No. 1, Jan. 1, 2000, pp. 70-72.

(Continued)

*Primary Examiner* — John M Bedtelyon
(74) *Attorney, Agent, or Firm* — Ladas & Parry

(57) ABSTRACT

An optical-waveguide grating modulator is compatible with high-frequency electrical modulation signals of limited bandwidth. The modulator comprises an optical grating formed in an optical waveguide constructed from electro-optic (EO) material and an electrode that is an RF waveguide or RF transmission line that conducts a traveling-wave electromagnetic (EM) field and that contains a portion of the optical-grating waveguide with a continuous grating. The RF input modulation signal is coupled into an RF EM field that propagates through the RF waveguide or transmission line in a direction that is parallel to the direction the light propagates in the optical-grating waveguide and that EM field overlaps the optical-grating waveguide. The light travels along the optical-grating waveguide preferably at the same velocity as the RF EM field travels along the RF waveguide or transmission line.

35 Claims, 10 Drawing Sheets

(56) References Cited

U.S. PATENT DOCUMENTS

| | | | |
|---|---|---|---|
| 5,936,589 | A | 8/1999 | Kawahata |
| 5,940,196 | A | 8/1999 | Piehler et al. |
| 5,963,567 | A | 10/1999 | Veselka et al. |
| 6,246,500 | B1 | 6/2001 | Ackerman |
| 6,268,781 | B1 | 7/2001 | Schaffner |
| 6,418,248 | B1 | 7/2002 | Hayes |
| 6,509,809 | B1 | 1/2003 | Lynch |
| 6,522,793 | B1 | 2/2003 | Szilagyi et al. |
| 6,525,692 | B2 | 2/2003 | Kim |
| 6,640,020 | B2 | 10/2003 | Ionov |
| 6,703,596 | B1 | 3/2004 | Moran |
| 6,724,523 | B2 | 4/2004 | Yap |
| 6,996,345 | B1 | 2/2006 | Chen |
| 7,133,576 | B2 | 11/2006 | Coldren et al. |
| 7,260,280 | B2 | 8/2007 | Ichioka et al. |
| 7,369,722 | B2 | 5/2008 | Yilmaz et al. |
| 7,471,258 | B2 | 12/2008 | Hsu |
| 7,486,247 | B2 | 2/2009 | Ridgway et al. |
| 7,555,219 | B2 | 6/2009 | Cox |
| 7,558,488 | B2 | 7/2009 | Matsui et al. |
| 7,657,132 | B1 * | 2/2010 | Yap et al. ............ 385/10 |
| 7,660,491 | B2 | 2/2010 | Thaniyavarn |
| 7,738,794 | B2 | 6/2010 | Akiyama |
| 7,809,216 | B2 | 10/2010 | Cox |
| 7,826,751 | B2 | 11/2010 | Cox |
| 7,835,600 | B1 | 11/2010 | Yap |
| 8,059,045 | B1 | 11/2011 | Schaffner |
| 8,059,969 | B1 | 11/2011 | Yap |
| 8,078,014 | B1 | 12/2011 | Efimov |
| 8,180,183 | B1 | 5/2012 | Yap |
| 8,263,928 | B1 | 9/2012 | Efimov |
| 8,498,539 | B1 | 7/2013 | Ilchenko |
| 8,750,709 | B1 | 6/2014 | Schaffner |
| 2001/0021294 | A1 | 9/2001 | Cai et al. |
| 2002/0097945 | A1 | 7/2002 | Chang et al. |
| 2002/0105378 | A1 | 8/2002 | Tapio |
| 2003/0048232 | A1 | 3/2003 | Lynch |
| 2003/0214450 | A1 | 11/2003 | Lynch |
| 2003/0235368 | A1 | 12/2003 | Kulishov et al. |
| 2004/0067006 | A1 | 4/2004 | Welch |
| 2004/0179825 | A1 | 9/2004 | Im |
| 2005/0094917 | A1 | 5/2005 | Wang |
| 2006/0270368 | A1 | 11/2006 | Caimi et al. |
| 2007/0189778 | A1 | 8/2007 | Burns |
| 2008/0069491 | A1 | 3/2008 | Kissa et al. |
| 2009/0016729 | A1 | 1/2009 | Ridgway |
| 2009/0051614 | A1 | 2/2009 | Wong et al. |
| 2009/0185810 | A1 | 7/2009 | Kaplan |

OTHER PUBLICATIONS

Kim, R. et al., "Distributed Bragg feedback intensity modulator in Ti:LiNbO$_3$", Electronic Letters, vol. 41, No. 18, Sep. 1, 2005.

Shaw et al., "Optical slow-wave resonant modulation in electro-optic GaAs/AlGaAs modulators", Electronics Letters, vol. 35, No. 18, Sep. 2, 1999, pp. 1557-1558.

Taylor, Henry F., "Enhanced electrooptic modulation efficiency utilizing slow-wave optical propagation", Journal of Lightwave Technology, vol. 17, No. 10, Oct. 1999, pp. 1875-1883.

Yap, D. et al., "Compact electro-optic modulator for direct integration into an X-band antenna array front-end", Digest 2010 IEEE International Topical Meeting on Microwave Photonics, pp. 35-38.

U.S. Appl. No. 12/252,189, filed Oct. 15, 2018, Hsu.

U.S. Appl. No. 13/651,399, filed Oct. 13, 2012, Yap.

Ackerman, Edward I. et al., "Optimization of Photonic Transmit/Receive Module Performance", Microwave Photonics, International Topical Meeting, Oct. 2009, p. 1-4.

Adams, R.C., et al., "Testing and integration of the COMWIN antenna system," COMWIN Antenna System Fiscal Year 200 Report, SPAWAR, Technical Report 1836, (Sep. 2000), pp. 637-641.

Betts, G.E., et al., "High-Sensitivity Bandpass RF Modulator in LiNbO$_3$," SPIE Integrated Optical Circuit Engineering VI, vol. 993, pp. 110-116 (1988).

Bridges and Schaffner, "Distortion in Linearized Electrooptic Modulators," IEEE Transactions on Microwave Theory and Techniques, vol. 43, No. 9, pp. 2184-2197 (Sep. 1995).

Cho, et al., "Electrooptic-distributed Bragg-reflection modulators for integrated optics," IEEEE Journal of Quantum Electronics, vol. QE-13, No. 4, pp. 206-208 (Apr. 1977).

Cohn, S.B., et al.,"Optimum Design of Stepped Transmission-line Transformers," IRE Trans. Microwave Theory Tech., vol. 3, No. 3, pp. 16-20 (Apr. 1955).

Cutolo, et al., "An electrically controlled Bragg reflector integrated in a rib silicon on insulator waveguide," Applied Physics Letters, vol. 71, No. 2, pp. 199-201 (Jul. 14, 1997).

Dagli, Nadir, "High-Speed Photonic Devices," Series in Optics and Optoelectronics, 2007, pp. 31-41, Taylor & Francis Group, LLC, Boca Raton, FL.

Elliott, Robert S., Electromagnetics, IEEE Press. New York, 1993, equation 5.85, p. 285-291.

Emerson and Cumming Microwave Products, Eccostock HiK500F data sheet, www.eccosorb.com, rev. May 11, 2007.

Farwell, et al., "Increased linear dynamic range by low biasing the Mach-Zehnder modulator," IEEE Photonics Technology Letters, vol. 5, No. 7, pp. 779-782 (Jul. 1993).

Fusco, V. "Tunable high isolation directional coupler based circulator," 2009 IET Seminar on Adaptable and Tunable Antenna Technology for Handsets and Mobile Computing Products (21 pages).

Ghatak, A.K., et al., "Optical Electronics," pp. 441-448, Cambridge University Press, 1989.

Gheorma, Iona L., et al., "RF Photonic Techniques for Same Frequency Simultaneous Duplex Antenna Operation", IEEE Photonics Technology Letters, Jul. 2007, p. 1014-1016, vol. 19, No. 13.

Hsu, R.C., et al., "All-dielectric photonic-assisted radio front-end technology," Nature Photonics, vol., pp. 535-538 (Sep. 2007).

Hukriede, J., et al., "Fabrication and application of holographic Bragg gratings in lithium niobate channel waveguides," J. Phys. D: Appl. Phys. 36 (2003) R1-R16.

Irace, A. et al. All-silicon optoelectronic modulator with 1 GHz switching capability. Electronics Letters, 39:2:232-233, Jan. 2003.

Johnson, et al., "Linearization of an interferometric modulator at microwave frequencies by polarization mixing," IEEE Photonics Technology Letters, vol. 2, No. 11, pp. 810-811 (Nov. 1990).

Jung, I.M. et al. Efficient optical intensity modulator based on the electrically tunable LiNbO$_3$ reflection grating for analog fiber-optic links. Journal of the Optical Society of Korea, 11:1:1-5, Mar. 2007.

Kim, Wan-Kyu, et al., "A Passive Circulator with High Isolation using a Directional Coupler for RFID", School of ECE, University of Seoul, Seoul, 130-743, Korea, p. 1177-1180.

Kumar, G., et al., "Broadband Microstrip Antennas," Table 2, p. 43, Artech House (2003).

Lee, R.T., et al., "A design study for the basic TEM horn antenna," IEEE Antennas and Propagation Magazine, vol. 46, No. 1, pp. 86-92 (Feb. 2004).

LINX Technologies RXM-900-HP-II RF Module specification—<www.linxtechnologies.com> Web. Dec. 30, 2008.

MAXIM, Receiver Sensitivity Equation for Spread Spectrum Systems, MAXIM application note 1140, Jun. 28, 2002 www.maxim-ic.com/an1140 (5 pages).

Mitomi, Osamu et al., "Design of Ultra-Broad-Band LiNbO$_3$ Optical Modulators with Ridge Structure", IEEE Transactions on Microwave Theory and Techniques, Sep. 1995, p. 2203-2207, vol. 43, No. 9.

Morito, K., et al., "A Broad-Band MQW Semiconductor Optical Amplifier with High Saturation Output power and Low Noise Figure," IEEE Photon. Technol. Letters, vol. 17, No. 5, pp. 974-976 (May 2005).

NAVSYNC CW20 GPS receiver specification—www.naysync.com, 2007.

Pierno, L. et al. A lithium niobate electro-optic tunable Bragg filter fabricated by electron beam lithography. Journal of Optics A: Pure and Applied Optics, 10:064017, May 2008 (6 pages).

Ruze. J., "Wide-Angle Metal Plate Optics," Proceedings of the I.R. E., vol. 38, No. 1, pp. 53-59 (Jan. 1950).

Secchi, Al. et al. Design of electro-optic Bragg amplitude modulator. Proceedings of COMSOL Users Conference 2006, retrieved from cds.comsol.com/access/dl/papers/1629/Secchi.pdf. (7 pages).

(56) References Cited

OTHER PUBLICATIONS

Shaw, et al., Electronics Letters, vol. 35, No. 18, pp. 1557-1558 (Sep. 2, 1999).
Shi, W., et al., "Demonstration of Dual-Depletion-Region Electroabsorption modulator at 155 μm Wavelength for High Speed and Low Driving Voltage Performance," IEEE Photonics Technology Letters, vol. 17, No. 10, pp. 2068-2070 (Oct. 2005).
Sun, et al., "High spurious free dynamic range fibre link using a semiconductor electroabsorption modulator," Electronic Letters, vol. 31, No. 11, pp. 902-903 (May 1995).
Suzuki, T., et al., "Design of a tunnel relay system with a leaky coaxial cable in an 800-MHz band land mobile telephone system," IEEE Transactions on Vehicular Technology, vol. 29, No. 3, pp. 305-316 (Aug. 1980).
Taylor, "Enhanced electrooptic modulation efficiency utilizing slow-wave optical propagation," Journal of Lightwave Technology, vol. 17, No. 10, pp. 1875-1883 (Oct. 1999).
Thomas, R.W., et al., "Radiax™, a new radiating coaxial cable," Vehicular Technology Conference, 22nd IEEE, vol. 22, (Dec. 7-8, 1971) (16 pages).
Wait, J.R., "Electromagnetic Theory of the Loosely Braided Coaxial Cable: Part 1," IEEE Transactions on Microwave Theory and Techniques, vol. MIT-24, No. 9 (Sep. 1976), pp. 547-553.
Welstand, et al., "Enhanced linear dynamic range property of Franz-Keldysh effect waveguide modulator," IEEE Photonics Technology Letters, vol. 7, No. 7, pp. 751-753 (Jul. 1995).
Wood, L., "Opening Statement before the United States Senate committee on the Judiciary, Subcommittee on Terrorism," Mar. 8, 2005 (5 pages).
Xu, W. et al. Electrically tunable thermally-poled Bragg gratings. Bragg Gratings, Photosensitivity, and Poling in Glass Waveguides, vol. 33 of OSA Trends in Optics and Photonics Series, paper DA3, Sep. 1999, pp. 363-367.
From U.S. Appl. No. 12/234,980 (now U.S. Pat. No. 8,078,014), Office Action mailed on Aug. 25, 2011.
From U.S. Appl. No. 12/234,980 (now U.S. Pat. No. 8,078,014), Office Action mailed on Feb. 24, 2011.
From U.S. Appl. No. 12/234,980 (now U.S. Pat. No. 8,078,014), Office Action mailed on Sep. 3, 2010.
From U.S. Appl. No. 12/176,071 (now U.S. Pat. No. 7,835,600), Office Action mailed on Jul. 15, 2010.
From U.S. Appl. No. 12/176,071 (now U.S. Pat. No. 7,835,600), Office Action mailed on Apr. 7, 2010.
From U.S. Appl. No. 12/176,089 (now U.S. Pat. No. 8,180,183), Office Action mailed on Jan. 20, 2012.
From U.S. Appl. No. 12/176,089 (now U.S. Pat. No. 8,180,183), Office Action mailed on Jul. 20, 2011.
From U.S. Appl. No. 12/176,089 (now U.S. Pat. No. 8,180,183), Office Action mailed on Oct. 5, 2010.
From U.S. Appl. No. 12/176,089 (now U.S. Pat. No. 8,180,183), Office Action mailed on Jul. 26, 2010.
From U.S. Appl. No. 12/176,089 (now U.S. Pat. No. 8,180,183), Office Action mailed on May 12, 2010.
From U.S. Appl. No. 12/176,089 (now U.S. Pat. No. 8,180,183), Office Action mailed on Nov. 9, 2009.
From U.S. Appl. No. 12/141,834 (now U.S. Pat. No. 8,059,969), Office Action mailed on Jul. 11, 2011.
From U.S. Appl. No. 12/141,834 (now U.S. Pat. No. 8,059,969), Office Action mailed on Apr. 14, 2011.
From U.S. Appl. No. 12/141,834 (now U.S. Pat. No. 8,059,969), Office Action mailed on Mar. 31, 2011.
From U.S. Appl. No. 12/141,825 (now U.S. Pat. No. 7,657,132), Office Action mailed on Sep. 18, 2009.
From U.S. Appl. No. 12/141,825 (now U.S. Pat. No. 7,657,132), Office Action mailed on Apr. 3, 2009.
From U.S. Appl. No. 13/651,399 (unpublished), Office Action mailed on Jun. 26, 2014.
From U.S. Appl. No. 13/651,399 (unpublished), Office Action mailed on Jan. 29, 2014.
From U.S. Appl. No. 13/651,399 (unpublished), Office Action mailed on Nov. 7, 2014.
From U.S. Appl. No. 12/959,287 (unpublished, non publication request filed), Office Action mailed on Mar. 31, 2014.
From U.S. Appl. No. 12/959,287 (unpublished, non publication request filed), Office Action mailed on Aug. 12, 2014.
From U.S. Appl. No. 12/959,287 (unpublished, non publication request filed), Office Action mailed on Sep. 23, 2014.
From U.S. Appl. No. 12/959,287 (unpublished, non publication request filed), Notice of Allowance mailed on Nov. 20, 2014.
From U.S. Appl. No. 12/959,287 (unpublished, non publication request filed), Notice of Allowance mailed on Dec. 23, 2014.
U.S. Appl. No. 12/959,287, filed Dec. 2, 2010, Schaffner.
U.S. Appl. No. 12/252,189, filed Oct. 15, 2008, Hsu.
From U.S. Appl. No. 12/176,114 (now published as U.S. Pat. No. 8,750,709), Office Action mailed on May 3, 2011.
From U.S. Appl. No. 12/176,114 (now published as U.S. Pat. No. 8,750,709), Office Action mailed on Oct. 18, 2011.
From U.S. Appl. No. 12/176,114 (now published as U.S. Pat. No. 8,750,709), Office Action mailed on May 3, 2013.
From U.S. Appl. No. 12/176,114 (now published as U.S. Pat. No. 8,750,709), Office Action mailed on Sep. 18, 2013.
From U.S. Appl. No. 12/176,114 (now published as U.S. Pat. No. 8,750,709), Notice of Allowance mailed on Nov. 22, 2013.
From U.S. Appl. No. 12/176,114 (now published as U.S. Pat. No. 8,750,709), Notice of Allowance mailed on Dec. 5, 2013.
Ayazi, A.; Hsu, R.C.J; Houshmand, B.; Steier, W.H.; and Jalali, B. entitled "All-dielctric photonic-assisted wireless receiver," Optics Express, vol. 16, No. 3, Feb. 4, 2008, pp. 1742-1747.
Bridges, William B., Finbar Sheehy, Finbar T., Schaffner, James H., "Wave-Coupled LiNbO3 Electrooptic Modualtor for Microwave and Milliemter-Wave Moduation," IEEE Photonics Tech. Letters, vol. 3, No. 2, Feb. 1991, pp. 133-135.
Collins, Robert E., Foundations for Microwave Engineering, McGraw-Hill, New York, 1966, at pp. 237-254.
Harrington, Roger F., Time-Harmonic Electromagnetic Fields, McGraw-Hill, New York, 1961, pp. 381-395.
Khurgin, et al., "Ultrabroad-bandwidth elecro-optic modulator based on a cascaded Bragg grating," Optical Letters, vol. 25, No. 1, pp. 70-72 (Jan. 2000).
Kim, et al., "Distributed Bragg Feedback Intensity Modulator in Ti:LiNbO$_3$," Electronics Letters, vol. 41, No. 18, Sep. 1, 2005 (2 pages).
Kim, S. Geary, K., Chang, D., Fetterman, Zhang, H., Zhang, C., Wang, C., and Steier, W., "TM-pass Electro-optic APC-CPW Polymeric Modulators with Poling-Induced Waveguides and Self-Aligned Electrodes," Optical Fiber Communications Conference 2003, OFC 2003, Mar. 23-28, 2008, pp. 319-320.
Liang, Jia Y. and Wilson, Mike G. F., "An Integrated Optical Fabry-Perot Modulator in LiNbO$_3$," Microwave and Optical Techology Letters, vol. 6, No. 15, 1993, pp. 867-869.
Rahman. B.M.A. and Haxha, S., "Optimization of Microwave Properties for Ultra-Speed Etched and Unetched Lithium Niobate Electrooptic Modulators," J. Lightwave Tehnology, vol. 20, No. 10, Oct. 2002, pp. 1856-1863.
Rigden, John S., Macmillan Encyclopedia of Physics, Simon & Schuster, 1996, p. 353.
Walker, Robert G., "High-Speed III-V Semiconductor Intensity Modulators," IEEE J. Quantum Electronics, vol. 27, No. 3, Mar. 1991, pp. 654-667.

\* cited by examiner

Fig. 3b *(cross sectional side view)*

Fig. 3c *(top view)*

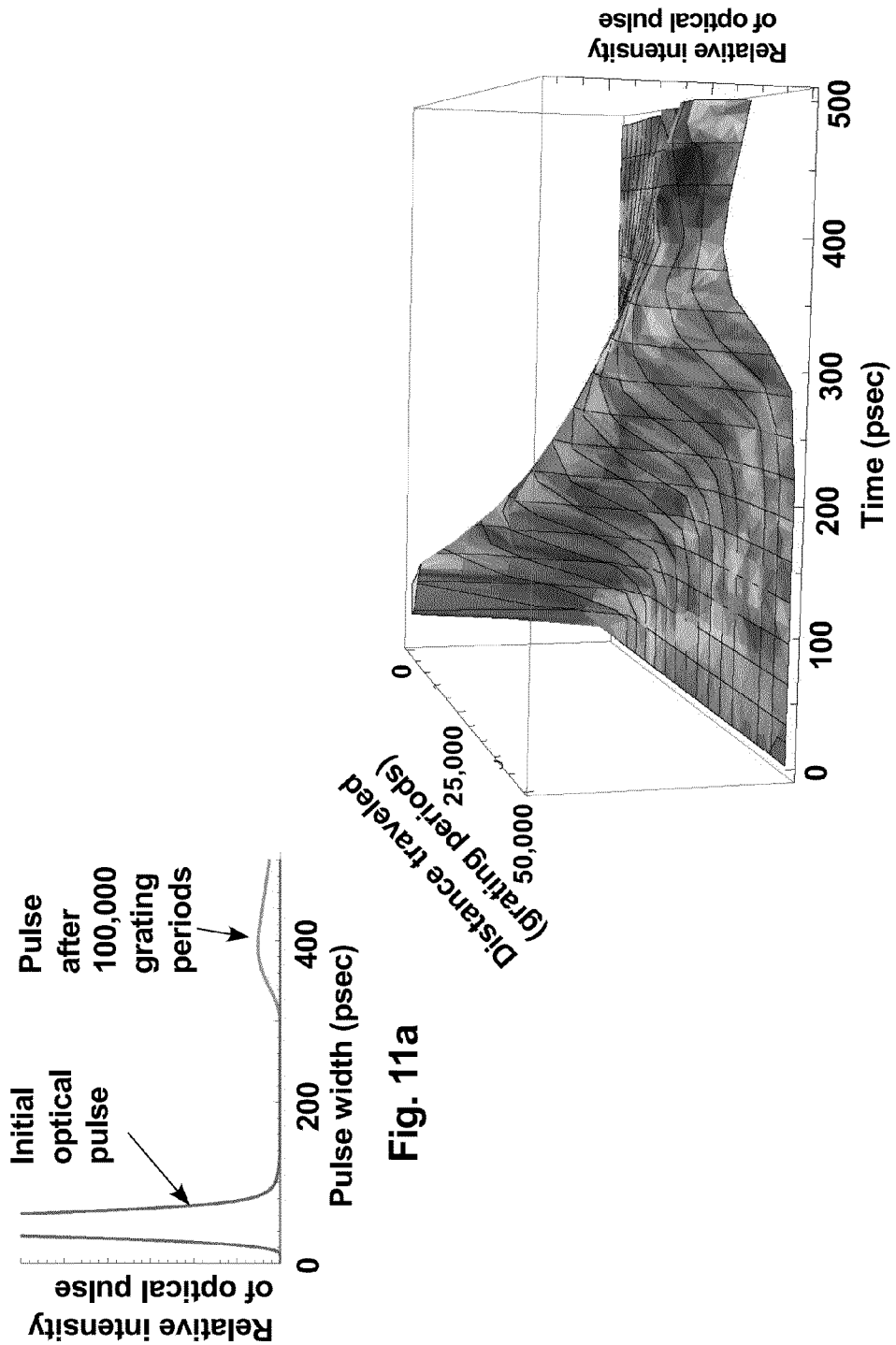

ELECTRO-OPTIC GRATING MODULATOR

CROSS REFERENCE TO RELATED APPLICATIONS

This application is related to U.S. Pat. No. 7,835,600 issued Nov. 16, 2010 and entitled "Microwave Receiver Front-End Assembly and Array" the disclosure of which is hereby incorporated herein by reference. This application is also related to U.S. patent application Ser. No. 12/239,980 by Oleg Efimov filed Sep. 22, 2008.

TECHNICAL FIELD

This disclosure relates to an optoelectronic modulator for use in RF photonic links and more particularly of an electro-optic grating modulator with velocity matched traveling-wave electrodes.

BACKGROUND

Optical or photonic links that comprise a laser, an optoelectronic modulator and a photodetector are known in the realm of RF photonics.

A prior art grating intensity modulator is described in an article by R. Kim et al. (Electronics Letters, vol. 41, no. 18, 1 Sep. 2005) and is illustrated in FIG. 1. This modulator has a bulk electrode in which the RF signal is applied to the electrode as a whole rather than being propagated along the electrode, from one end of the electrode to the other. This prior optical grating waveguide intensity modulator has the RF modulating signal applied to the entire length of the grating by means of a lumped element electrode. Thus, the capacitance of that electrode limits the frequency response of the modulator.

Another modulator is described U.S. Pat. No. 7,835,600 noted above and in an article by D. Yap et al. (Digest 2010 IEEE International Topical Meeting on Microwave Photonics, pp. 35-38). In that modulator, the electrode is part of an RF waveguide, to avoid limiting the frequency response by capacitance effects, and the RF and optical field propagate in perpendicular directions. The maximum modulation frequency can be limited by the group delay of the light propagating through the grating. For the prior arrangement of perpendicular propagating optical and RF fields, the group delay through the grating should be substantially less than one-half cycle of the highest frequency RF modulating signal. The modulation efficiency of these prior modulators, which describes the amount of intensity modulation that is obtained for a given modulation of the voltage applied at the electrodes, increases as the length of the grating is increased and as the size of the effective periodic refractive-index steps is increased. However, these increases in the grating length and index step also increase the group delay of the light. As a result, an improvement in the modulation efficiency would be achieved only at the expense of a corresponding reduction of the maximum modulation frequency and the modulation bandwidth.

Although there has been a long-standing desire to improve the modulation frequency achieved with optical grating intensity modulators, such a modulator has not been achieved in the past. This disclosure describes how such a high-frequency optical-grating modulation can be and has been achieved.

There is a need to obtain high efficiency intensity modulators that have large modulation bandwidths. A common prior art wideband intensity modulator is a Mach Zehnder interferometric modulator. This prior modulator (such as illustrated in FIG. 2a) contains an optical splitter (or a 3 dB coupler) that divides the input light into two optical-waveguide arms. The light in those two arms is then combined by an optical combiner (or another 3 dB coupler) to provide the output of the modulator. The intensity of the output light depends on the relative phases of the light coupled from the two waveguide arms, and the interference between that light.

To achieve a wideband modulation response, a goal of these prior Mach Zehnder modulators is to match the velocity of the traveling RF field with the velocity of the traveling optical field (the light being modulated). Some prior Mach Zehnder modulators also contain cascaded sets of multiple optical-waveguide gratings in the two arms of the interferometer. The desired function of the gratings in these prior modulators is to change the group velocity of the light propagating through them. The applied RF field changes the optical refractive index of the waveguide and grating material to produce a net change in the phase of the light propagated through the chain of grating reflectors and waveguide segments without substantially changing the intensity of that light. To produce a change in the intensity of the light output from the modulator, that chain of grating reflectors and waveguide segments is incorporated in the two arms of a Mach Zehnder interferometer and receive different modulation of their refractive index, resulting in a phase modulation of the light propagating through those arms. Any direct intensity modulation of the light directly by the gratings of these prior art modulators is undesirable and would interfere with the desired operation of the Mach Zehnder modulators.

Optical Mach-Zehnder modulators that contain multiple gratings in their interferometer arms wherein the overall transmittance of the modulator is modulated by the electric field carried by a traveling-wave RF electrode are described in articles by Shaw et al. (Electronics Letters, vol. 35, no. 18, 2 Sep. 1999, pp. 1557-1558), by Taylor (Journal of Lightwave Technology, vol. 17, no. 10, October 1999, pp. 1875-1883) and by Khurgin et al. (Optics Letters, vol. 25, 2000, pp. 70-72). FIG. 2b shows an illustration of a portion of these prior modulators. In some modulators, the multiple gratings are separated by optical-waveguide sections. The function of the multiple gratings is to serve as optical reflectors, with each pair of such grating reflectors and the optical waveguide segment between them acting as an optical etalon. In others of these modulators, multiple pairs of grating segments that have differing grating periods are cascaded end to end. The cascade of etalons or cascade of pairs of dissimilar gratings slows down the group velocity of the light propagating through that cascade.

In these prior art modulators, the grating is used solely as a means to increase the group delay (or decrease the group velocity) of light propagating through the grating. The prior art modulators that have multiple grating reflectors in a cascade of Fabry Perot resonators operate at a wavelength for which the grating transmittance is minimal (transmittance notch) and the grating reflectance is high. The cascade of resonators produces the "slowing" of the velocity of the light. The prior cascade of multiple pairs of grating segments that have different grating periods likewise produces a "slowing" of the velocity of the light. For modulators formed from lithium niobate material, this "slowing" of the light makes it easier to match the velocity of the co-propagating RF field traveling in the RF electrodes with the velocity of the light in the two arms of the interferometer.

Although some prior modulators have combined optical waveguide gratings with RF traveling-wave electrodes in which the RF field co-propagates with the light traveling through the optical waveguide gratings, the desired effect of the RF field is to produce only a phase modulation of the light exiting the grating and not to produce any intensity modulation of the light transmitted through a given optical-waveguide grating or cascade of grating segments.

BRIEF DESCRIPTION OF THE INVENTION

An optical-waveguide grating modulator is disclosed which is compatible with high-frequency electrical modulation signals (with frequencies typically greater than several GHz and bandwidths also typically greater than several GHz). The modulator comprises an optical grating formed in an optical waveguide constructed from electro-optic (EO) material and an electrode that is an RF waveguide or RF transmission line that conducts a traveling-wave electromagnetic (EM) field and that contains a portion of the optical-grating waveguide with a continuous grating. The RF input modulation signal is coupled into an RF EM field that propagates through the RF waveguide or transmission line in a direction that is parallel to the direction the light propagates in the optical-grating waveguide and that EM field overlaps the optical-grating waveguide. The light to be modulated is coupled into one end of the optical-grating waveguide. The light travels along the optical-grating waveguide preferably at the same velocity as the RF EM field travels along the RF waveguide or transmission line. The modulated light is coupled out from the opposite end of the optical-grating waveguide. Exemplary embodiments described herein include optical-grating waveguides with grooves etched into EO material to form the grating and optical-grating waveguides with grooves etched into a high-index material deposited above the EO material to form the grating. These embodiments also include transverse electromagnetic (TEM) RF waveguides, coplanar waveguide (CPW) RF transmission lines and coplanar strip (CPS) RF transmission lines that conduct the traveling RF field. Another embodiment comprises multiple optical-waveguide gratings that are coupled to the same velocity-matched RF waveguide or transmission line. The modulated light from those multiple optical-waveguide gratings are combined and illuminate a photodetector to produce the RF output signal.

The modulator described in the present disclosure can achieve high modulation efficiency at much higher signal frequency than the prior grating-waveguide intensity modulator because it has traveling-wave electrodes instead of the capacitance-limited, lumped-element electrodes. The disclosed modulator achieves efficient modulation at even higher signal frequency by co-propagating the RF and optical fields and by matching the velocities of those fields. In contrast to the prior Mach-Zehnder interferometric modulators that that combine optical gratings with co-propagating RF and optical fields, the present invention makes use of a single, continuous grating to directly produce the intensity modulation of the light, without needing an additional interferometric waveguide configuration to convert from optical phase modulation to optical intensity modulation. To summarize, prior grating modulators have operated either at low modulation frequencies, using bulk electrodes rather than traveling-wave electrodes with co-propagating RF and optical fields, or they are based on an end-to-end cascade of grating segments in the arms of a Mach Zehnder interferometer.

Some embodiments of the present invention make use of multiple gratings that are placed side by side like the gratings in the two arms of a Mach Zehnder interferometer. However, the multiple gratings of the present invention cannot be interferometrically combined by means of an optical interferometer since they have different optical-carrier frequencies (optical wavelengths) and thus they do not optically interfere with each other. The present modulator operates with the optical carrier being at a wavelength on one of the two edges of the grating transmittance spectrum, rather than deep within the transmittance notch. Thus, the grating itself can be used to achieve intensity modulation of the light. There is no need to further include the grating in a Mach-Zehnder interferometer, as done in some of the prior modulators.

Compared to a grating that does not have a velocity matched electrode, this invention achieves stronger modulation depth (larger change in the intensity of light for the same modulation-controlling electric-field strength) while also being capable of high-frequency modulation with moderately large signal bandwidth. Compared to a phase-to-intensity modulator such as a Mach-Zehnder interferometer that has a traveling-wave electrode, this invention achieves the same modulation depth with a physically shorter device. Compared to an electro-absorption modulator that has a traveling-wave electrode, this invention can make use of a dielectric electro-optic material instead of a semiconductor material. Thus, the modulator of this invention can have a much higher electrical breakdown field strength compared to an electro-absorption modulator. This high breakdown field strength makes this modulator more robust when the modulator is exposed to high-energy EM fields whose intensity may be much higher than the intensity of the RF signal.

In one aspect the present invention provides an optical modulator structure comprising: an RF waveguide having a first longitudinal axis; and at least one optical grating waveguide having a second longitudinal axis located within the RF waveguide, the first longitudinal axis being parallel with and substantially coincident with the second longitudinal axis such that, in use, an RF field propagating in the RF waveguide and an optical field propagating in the optical grating waveguide propagate in substantially parallel directions, the at least one optical grating waveguide having a grating adapted to provide a notch in a transmission spectrum for the optical field propagating in the optical grating waveguide and having an operating wavelength of the optical field propagating in the optical grating waveguide wherein the operating wavelength is selected to occur at a transition from a substantially maximum transmission to greater than minimum transmission in said optical grating waveguide, the optical field propagating, in use, in the optical grating waveguide having an optical group velocity at the operating wavelength; wherein the RF field propagating, in use, in the RF waveguide has a RF group velocity sufficiently equal to the optical group velocity to obtain a desired amount of modulation by said optical modulator.

In another aspect the present invention provides an optical modulator structure comprising a substrate; and at least one optical grating waveguide having a first longitudinal axis disposed within the substrate and an RF waveguide having a second longitudinal axis disposed on the substrate, the first longitudinal axis being parallel with and substantially coincident with the second longitudinal axis such that, in use, an electric field propagating in the RF waveguide and an optical field propagating in the at least one optical grating waveguide propagate in substantially parallel directions, wherein the at least one optical grating waveguide includes a grating adapted to provide a notch for the optical field propagating, in use, in the optical grating waveguide and the at least one optical grating waveguide having an operating wavelength wherein the operating wavelength is selected to occur at a transition from substantially maximum transmission to greater than minimum transmission, the optical field propagating, in use, in the at least one optical grating waveguide having an optical group velocity at the operating wavelength; wherein the RF field propagating, in use, in the RF waveguide has a RF group velocity substantially equal to the optical group velocity.

In still yet another aspect the present invention provides an RF photonic transmitter comprising: an RF waveguide with a first end and a first longitudinal axis and at least one optical grating waveguide with a second end and a second longitudinal axis, wherein the first end is coincident with the second end and the first longitudinal axis is parallel with and substantially coincident with the second longitudinal axis such that an RF field propagating in the RF waveguide overlaps the optical grating waveguide, the optical grating waveguide having a grating adapted to provide a notch in a transmission spectrum of an optical field propagating in the at least one optical grating waveguide and wherein the optical field has an operating wavelength, the operating wavelength being selected to occur at a transition from substantially maximum transmission to greater than minimum transmission; an associated laser, for each of the at least one optical grating waveguide, emitting laser light at the operating wavelength of the at least one optical grating waveguide with which it is associated, the laser light of the associated laser entering its associated optical grating waveguide at the second end; and wherein the RF waveguide is adapted to receive an RF signal at the first end.

BRIEF DESCRIPTION OF THE DRAWINGS

FIG. 3b is an exploded cross sectional side view of the embodiment of FIG. 3a.

FIG. 3c present a top view of the embodiment of FIGS. 3a and 3b showing different lasers supplying the light transmitted through the different optical grating waveguides.

FIG. 5b is an exemplary spectral response of such a grating as is depicted by FIG. 5a.

FIGS. 7a and 7b shows an example of optical-grating waveguide modulator with CPW transmission line electrode, with FIG. 7b being a SEM showing only a portion of the optical-grating waveguide modulator as marked on FIG. 7a.

FIGS. 11a and 11b depict the temporal spreading of a short optical pulse propagated through the grating.

DETAILED DESCRIPTION

The present invention relates to an optical-waveguide grating modulator that modulates the light passing through it. The modulator modulates the intensity of the light that is partially transmitted through and partially reflected by one or more gratings. The modulation of that light is controlled by a traveling RF electromagnetic (EM) field that propagates parallel to the directions of the transmitted and reflected light and co-propagates with the transmitted light. The optical waveguide grating is fabricated in an electro-optic material whose optical refractive index depends on the electric-field component of the traveling RF field. When the material's optical refractive index is modulated by the time-varying RF field (the input RF signal), the transmission/reflection spectrum of the grating is shifted accordingly, along the frequency (or wavelength) axis. This changes the net transmission or reflection of the various frequency components of the light.

Figure 1:
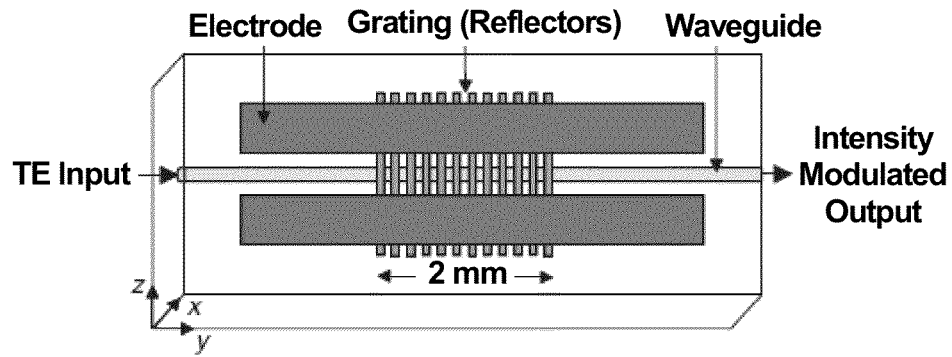
FIG. 1 is an illustration of a single-grating optical intensity modulator with non-traveling wave electrode known in the prior art.
Figure 2A:
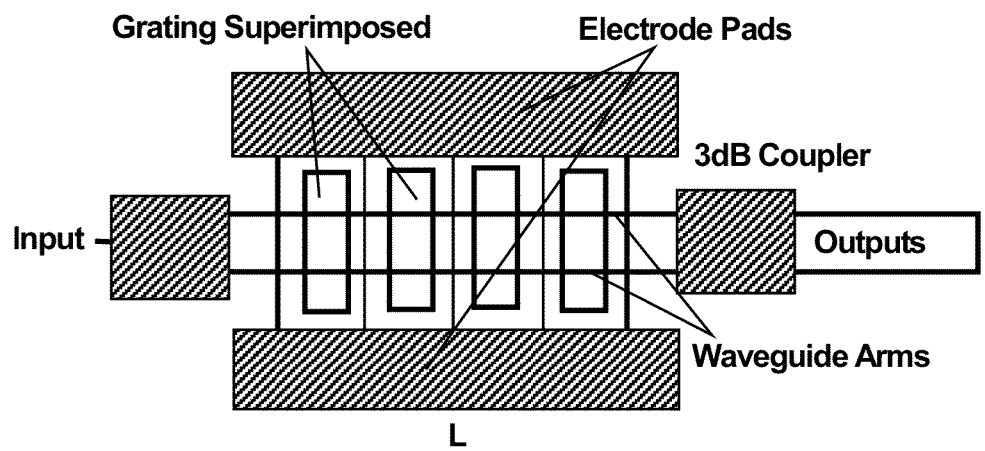
FIG. 2a is an illustration of a prior art Mach Zehnder interferometric modulator.
Figure 2B:
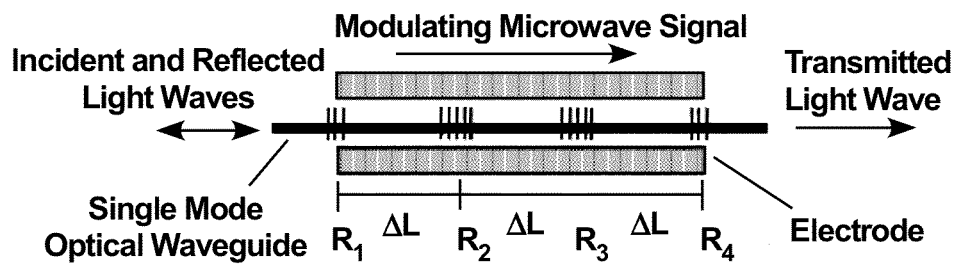
FIG. 2b is an illustration of a multiple-grating optical modulator with co-directional traveling-wave electrode known in the prior art.
Figure 3A:
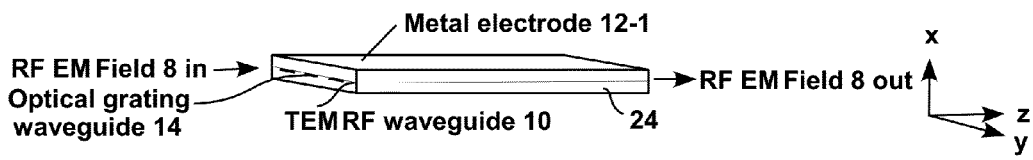
FIG. 3a is a perspective view which illustrates a TEM RF waveguide containing multiple strips of optical grating waveguides.

The disclosed modulator comprises one or more optical waveguide-gratings that are part of an RF waveguiding structure, such as a transverse electromagnetic (TEM) RF waveguide 10, as is illustrated in FIGS. 3a, 3b and 3c. The TEM RF waveguide 10 comprises a slab 24 of dielectric material that is sandwiched on two sides by electrically conductive metal electrodes 12-1 and 12-2. An EM field 8 propagating through that RF waveguide has electric field lines that are directed from one of the two electrodes 12-1 to the other of the two electrodes 12-2. There is at least one optical-grating waveguide 14 located within the dielectric slab 24 that contains a grating layer 16. Three optical-grating waveguides 14, arranged parallel to one another, are depicted in the embodiment of FIG. 3a.

A desirable feature of the TEM RF waveguide 10 is that the electric field magnitude and direction is quite uniform over most of the slab of dielectric material. It is sufficient that at least a portion of that dielectric material comprises EO material and that portion substantially overlaps the optical field of the light propagating in the optical waveguides 14 whose optical refractive index can be modulated by the applied electric field.

The longitudinal axis of optical-grating waveguide(s) 14 is(are) arranged parallel to the longitudinal axis of the RF waveguide 10. Thus, light propagates through the optical-grating waveguide(s) 14 in a direction (the z-direction in FIG. 3a) that is parallel to the direction of propagation of the RF EM field 8. Note that a cross-section of the propagating RF EM field 8 completely overlaps the optical-grating waveguide 14. In fact, more than one optical-grating waveguide 14 generally can be formed in the same RF waveguide 10 as shown in FIG. 3a. Although for this figure the entire piece of dielectric material comprises EO material, only a portion thereof needs to be EO material as described below with respect to FIG. 3b. An EO material such as lithium niobate, gallium arsenide, indium phosphide or an electro-optic polymer may be utilized.

In a preferred embodiment, the EM field propagates through a TEM RF waveguide 10 having a pair of metal electrodes 12-1 and 12-2 that sandwich one or more optical waveguide gratings 14. The width of the TEM waveguide, which must be sufficiently wide (in the y-direction of FIG. 3a) for the RF waveguide 10 to support the desired frequency of the EM field 8, also is sufficient to accommodate multiple optical-waveguide gratings 14 that are disposed side to side. In some embodiments (see FIG. 3c), different ones of these multiple optical grating waveguides 14 are designed to provide optimal modulation for light of different optical-carrier frequencies (or wavelengths). The modulated light at these different optical-carrier frequencies can be combined and illuminate the same photodetector to produced a larger photocurrent, which is the output RF signal.

Figure 3D:
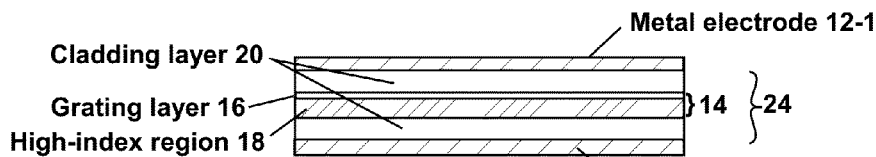
FIG. 3d depicts an optical waveguide grating as comprising a set of interfaces between two alternating portions of a composite waveguide that have different optical refractive indices ($n_{\mathit{eff}1}$ and $n_{\mathit{eff}2}$).
Figure 3D:
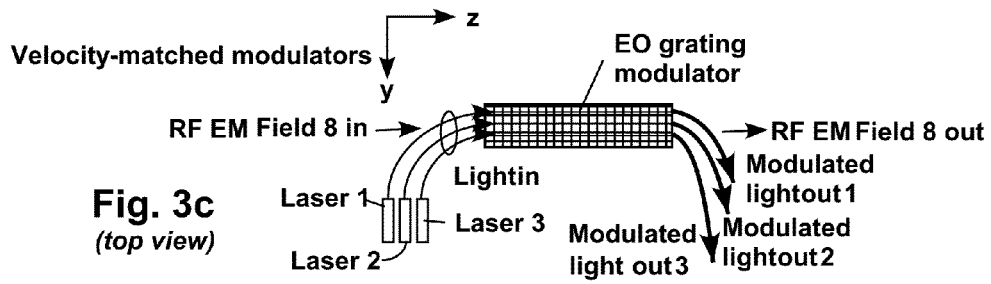
Figure 3D:
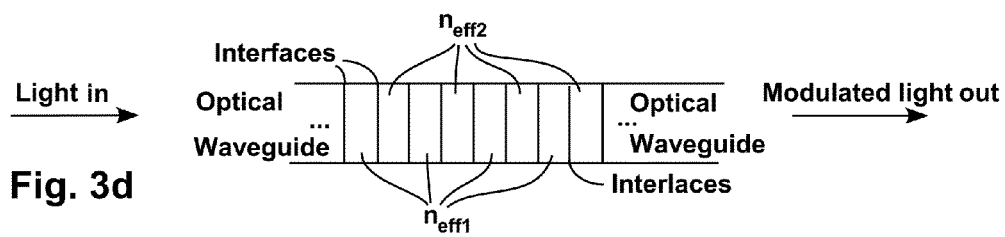

Each optical grating waveguide 14 contains a region 18 that has higher optical refractive index than the remaining material 20 of the slab 24. The higher optical refractive index material region 18, which comprises the effective core of the optical waveguide, also is preferably formed by an EO material such as lithium niobate, gallium arsenide, indium phosphide or an electro-optic polymer. The grating itself can be formed directly in the higher optical refractive index material region 18 or it can be formed in another material 16 that is optically coupled to the higher optical refractive index material region 18, as is illustrated by FIG. 3b. The combination of the grating region and the higher optical refractive index material 18 should have a higher net refractive index than the rest of the dielectric slab 24, so the rest of the dielectric slab 24 serves as cladding 20 of the optical waveguide(s) 14, with the higher optical refractive index material region 18 being the core of that waveguide(s) 14. The optical mode of the guided light is located in the vicinity of the high-index material and substantially overlaps the grating (see FIGS. 3a and 3b). A grating formed in an optical waveguide has a periodic spatial variation in its optical refractive index due to the periodic nature of the grating. The grating region can be thought of as comprising a periodic structure of two composite materials that have different optical refractive index as shown in FIG. 3d. One composite material has a relatively higher effective refractive index for the waveguided light (e.g., $n_{eff2}$) and the other composite material has a relatively lower effective refractive index for the waveguided light (e.g., $n_{eff1}$).

Figure 4B:
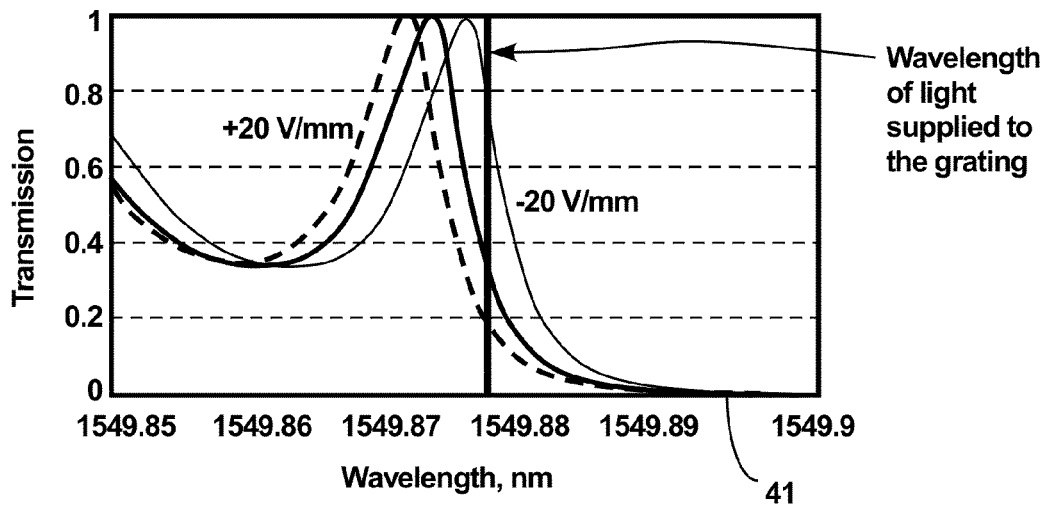
FIG. 4b is an illustration of E-field dependent shift of the grating spectrum with the left edge of the grating notch shown. The shift in the grating spectrum results in a change in the transmission for light of a given wavelength.
Figure 4A:
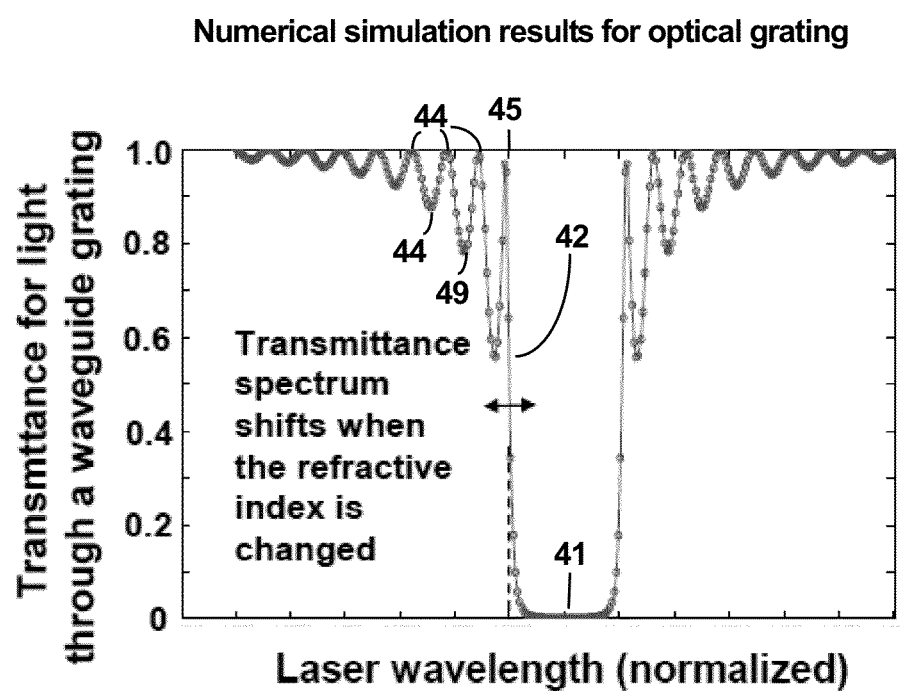
FIG. 4a illustrates the transmittance spectrum of an ideal optical waveguide grating showing a notch in the spectrum for which the grating transmission is low and the corresponding grating reflection is high.

A grating waveguide acts as a distributed Bragg reflector that can reflect certain wavelengths of the light propagating through the grating waveguide, transmit other wavelengths of the light and partially reflect yet other wavelengths of the light. An exemplary transmission spectrum of an ideal grating is shown in FIG. 4a. There is a notch 41 in the transmission spectrum. For the wavelengths coinciding with the notch 41, transmission is low and the light is reflected by the grating instead. For an optical waveguide-grating modulator, at least the grating and typically also the rest of the optical waveguide 14 is constructed in an EO material as mentioned above. The refractive index of the EO material changes when that material is exposed to an electric field. The change in refractive index shifts the grating transmittance spectrum, as illustrated in FIGS. 4a and 4b, toward longer or shorter wavelengths. For a given wavelength of light that coincides with an edge 42 of the transmission notch 41, this shifting of the transmittance spectrum results in modulation of the transmitted light, as is illustrated in FIG. 4b, as well as of the reflected light.

Figure 5A:
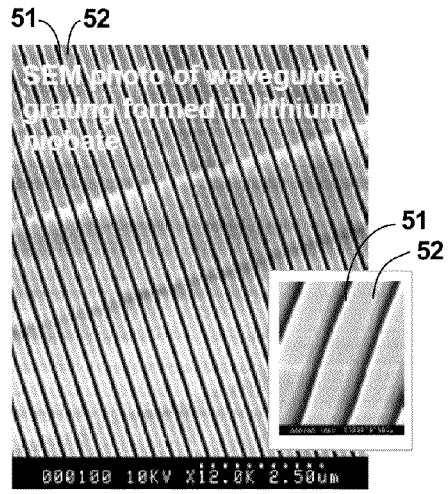
FIG. 5a is a view of an optical grating waveguide of lithium niobate with an etched grating.
Figure 5B:
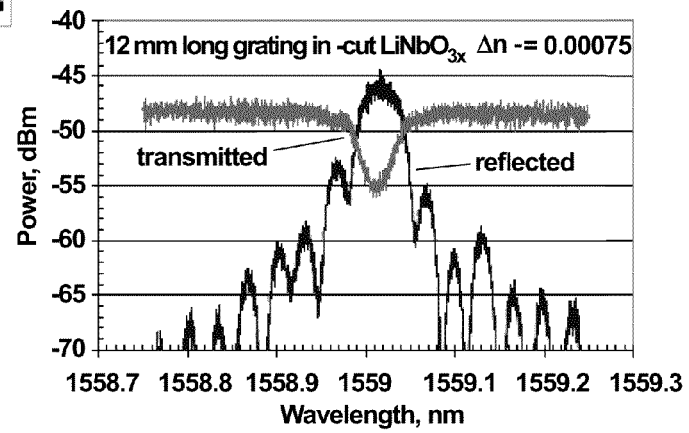

There are several known methods to form such a grating, with one method being to etch a periodic surface relief into a dielectric optical waveguide. FIG. 5a shows an illustration, made with the assistance of a scanning electron microscope, of such a surface grating that has been etched into a titanium-diffused lithium niobate (Ti:LiNbO$_3$) waveguide. For this etched-relief grating, the cross sectional regions comprising the periodically etched grooves 51 have the lower effective refractive index (e.g., $n_{eff1}$) and the unetched regions 52 between the grooves have the higher effective refractive index (e.g., $n_{eff2}$). An exemplary transmission spectrum of the grating is shown in FIG. 5b.

Figure 5C:
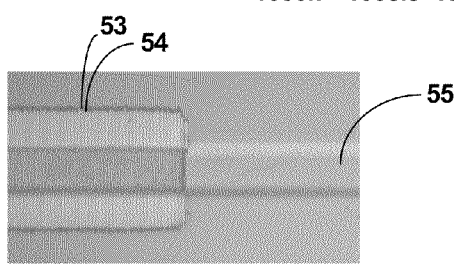
FIG. 5c depicts an optical grating waveguide formed from etching a grating into a silicon layer deposited above a lithium niobate waveguide.
Figure 5D:
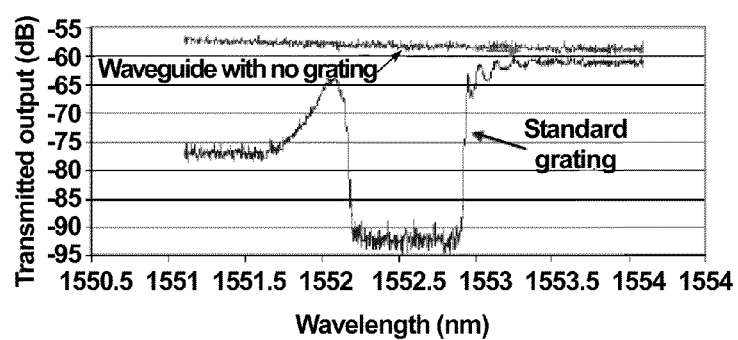
FIG. 5d depicts a graph of the measured optical transmission spectrum of the grating of FIG. 5c.

Another example of the optical grating waveguide comprises a titanium diffused waveguide formed in lithium niobate covered by a layer of high-index material, such as silicon. A periodic pattern of grooves is etched into the silicon layer to form the grating. An illustration of this structure is shown in FIG. 5c, which shows the silicon grating at the left and the uncovered titanium diffused waveguide at the right of the illustration. For this grating structure the regions comprising the periodic grooves 53 etched through the silicon layer plus the Ti:LiNbO$_3$ waveguide beneath those grooves have the lower effective refractive index (e.g., $n_{eff1}$) while the regions with the unetched silicon layer 54 plus the underlying Ti:LiNbO$_3$ waveguide have the higher effective refractive index (e.g., $n_{eff2}$). An exemplary transmission spectrum of such a grating waveguide is shown in FIG. 5d.

The light to be modulated typically is produced by at least one laser (see, for example, Laser 1, Laser 2 or Laser 3 in FIG. 3c) and preferably each laser generates a single wavelength at an optical-carrier frequency. FIG. 3c illustrates that the input light from the lasers (Laser 1, Laser 2 and Laser 3) is supplied to the same end of the RF waveguide 10 as the input RF EM field 8. In this case, the RF EM field 8 travels in the same direction as the light that is transmitted through the waveguide 14. The TEM RF waveguide 10 should be sufficiently wide in the y-direction (see FIG. 3a) that the RF waveguide 10 can support EM fields 8 of the desired frequency. In general, this width is at least one half of the wavelength of that EM field divided by the RF refractive index of the slab material 20 (square root of its RF dielectric constant). For a lithium niobate slab 20, the dielectric constant is approximately thirty, so the width of the TEM waveguide for X-band frequency is several millimeters. Such a wide slab can accommodate multiple optical grating waveguides 14 that can be located side by side and that extend from one end of the slab to the other end along the z-direction, as illustrated in FIGS. 3a and 3c. Note that for light of 1550 nm wavelength, a typical size of the guided optical mode is 10 micrometers or smaller. These optical waveguides 14 can be separated by a distance of only 10-20 micrometers and not have any optical interaction with each other. For comparison, the length of the slab (and of the grating) or the waveguide can be many millimeters or even many centimeters long. Also, the thickness of the slab, in the x-direction, can range from values of several tens of micrometers to several hundred micrometers.

Figure 3E:
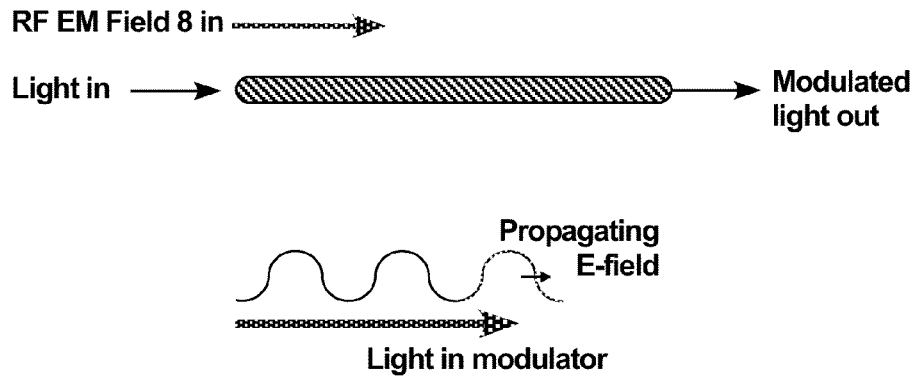
FIG. 3e illustrates an RF signal co-propagating with and velocity matched to the light propagating in the optical grating waveguide.

The grating of an electro-optic grating modulator can be considered as comprising a set of interfaces between adjacent portions of waveguide that have different optical refractive indices ($n_{eff1}$ and $n_{eff2}$) for the guided mode. See FIG. 3d. The amount of reflection or transmission occurring at an interface is dependent on the index difference (e.g., $n_{eff2}-n_{eff1}$). It also depends on the relative phase of the light that reaches the interface from one direction, to be transmitted through it, and the light that reaches the interface from the other direction, to be reflected from it. Modulation of the electric field applied across the grating waveguide modulates slightly the index difference. However, it can change greatly the relative phases of the light incident upon that interface. Thus, a time-varying electric field modulates the transmission/reflection that occurs at each interface. Preferably, a given front of the propagating optical field will continually see the same portion of the time-varying RF signal as that optical field propagates through the grating modulator, as illustrated in FIG. 3e. As a result, the modulation gradually builds up and is enhanced as those optical and RF fields propagate together. When the velocity of the light to be modulated is matched with the velocity of the RF field that controls the modulation, the time-varying change in the electric field is synchronized such that a particular portion of the RF waveform remains in step with a given portion of the light as that light propagates through the grating. This variation in the electric field modulates the transmission/reflection that occurs at the interfaces in the vicinity of that electric field. Assume, for example, that the local change in the electric field increases (or decreases) the net transmission of light through an interface. As the light propagates and encounters more and more interfaces, the accompanying local change in electric field continues to increase (or decrease) the transmission of that light through those additional interfaces. Thus, the depth of modulation of the transmittance of the light gradually become greater as that light propagates through the grating, from one end of the RF waveguide to the other end.

Some embodiments comprise multiple optical grating waveguides that are in the same RF waveguide. Those grating waveguides preferably are designed to operate at different optical-carrier frequencies. In general, the light for different ones of those multiple grating waveguides 14 is supplied by different lasers—which is why there are three different lasers shown in FIG. 3c. Since the modulated light output from the multiple grating waveguides are at different optical frequencies, they can be combined onto the same photodetector without incurring any optical interference for optical carrier frequencies that are spaced farther apart than the line width of the laser light and further apart than the maximum bandwidth of the RF modulation signal.

Figure 6:
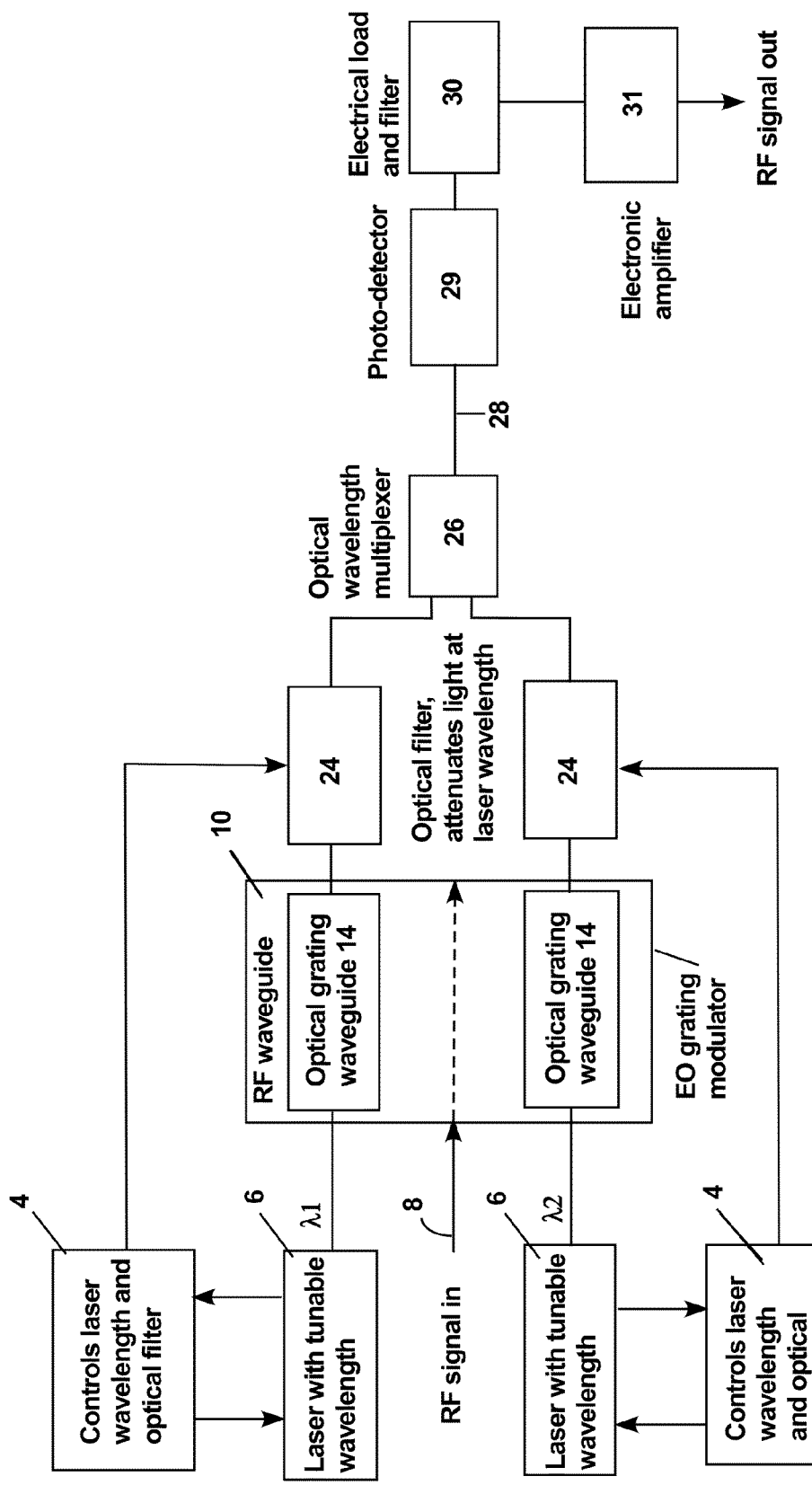
FIG. 6 shows a RF photonic link with a velocity-matched modulator comprising multiple optical grating waveguides.

FIG. 6 shows a block diagram of an RF photonic link 50 that contains multiple optical grating waveguides 14. The RF photonic link 50 shown in FIG. 6 also can include optional optical filters 24 that selectively attenuate the optical-carrier frequency (to further enhance the modulation depth) and an optional optical wavelength multiplexer 26 that combines the light of the differing frequencies into a common optical waveguide path (or optical fiber) 28. The lasers 6 are preferably tunable and controlled by controller 4 which also controls the filters 24 so that they continue to block the specific carrier wavelength $\lambda_1$ or $\lambda_2$ output by each of the lasers 6. The output of the multiplexer 26 on optical waveguide path or optical fiber 28 is photodetected at a photodetector 29, whose output is preferably applied to an electrical load and filter 30 before being amplified by an amplifier 31.

The optical carrier frequency is preferably variable so the laser 6 is depicted as having a tunable wavelength. The group velocity of the optical-carrier light propagating through the grating waveguide 14 varies with the optical carrier frequency. This optical carrier frequency of the laser light can be adjusted to fine tune the group velocities in the multiple gratings so that they all approximately match the velocity of the RF wave 8. Alternatively, the multiple gratings can be different from each other and can have their grating period or the optical guided-mode index of their optical waveguide designed such that each grating waveguide has the same group velocity although the optical carrier frequency of the light propagating in them is different for different ones of those multiple grating waveguides 14.

Figure 7A:
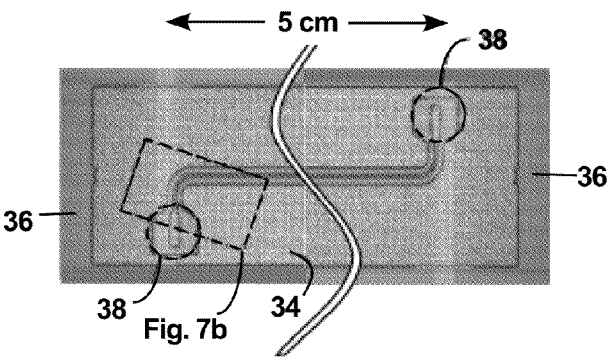
Figure 7B:
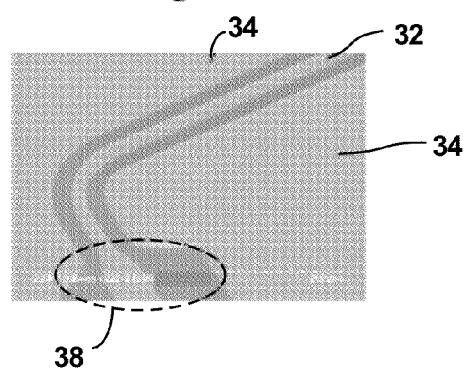

FIGS. 7a and 7b illustrate an example of an EO grating modulator for which the traveling RF field is carried in a single coplanar waveguide (CPW) transmission line. This CPW transmission line comprises a center-conductor electrode 32 and a pair of ground electrodes 34. The optical grating waveguide 14 is located underneath the center-conductor electrode 32. The optical grating waveguide 14 abuts non-grating optical waveguide 36 (such as the titanium-infused lithium niobate waveguide 55 shown on the right half of FIG. 5c). A portion of the optical waveguide 36 can be seen extending beyond the CPW transmission line shown in FIG. 7a. This exemplary modulator is formed in Z-cut lithium niobate, but other modulators could be formed in other electro-optic materials such as InP or GaAs. The CPW line terminates, at each end, in a set of ground-signal-ground pads 38 that are matched to the spacing of RF probes used to apply an RF signal to the electrode. The RF signal propagates along the CPW transmission line to an impedance load (not shown) connected to the set of pads located at the other end of that line. The CPW electrodes can be formed by electroplating a thick layer of gold above the top layer of dielectric material deposited onto the optical-waveguide substrate.

Figure 8:
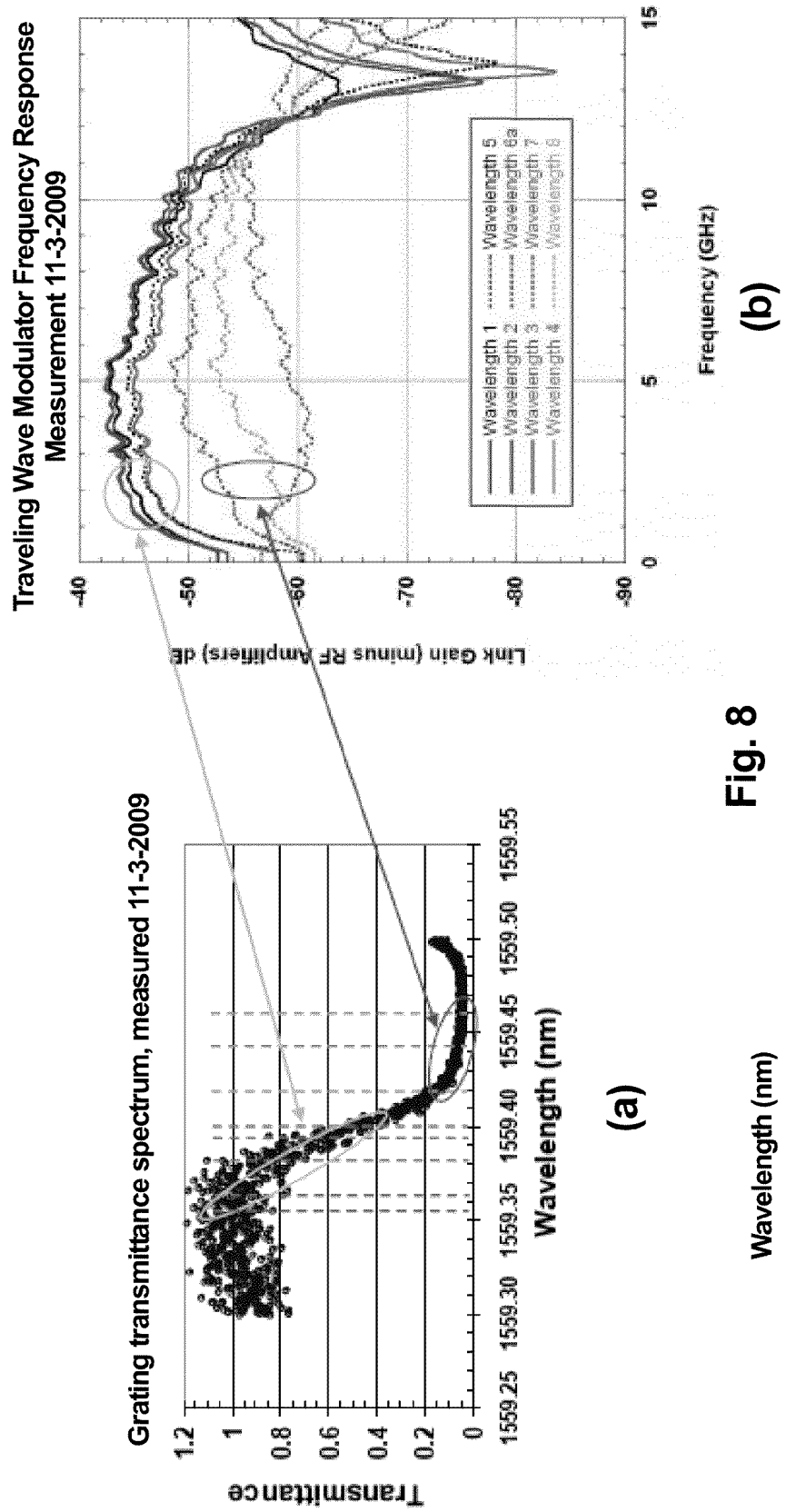
FIG. 8 graphs (a) and (b) depict the measured gain of link with traveling-wave grating modulator and measured optical transmission spectrum of the modulator grating.

FIG. 8 graph (b) shows the gain of a RF-photonic link containing the modulator of FIGS. 7a and 7b, as measured at several different wavelengths. The RF photonic link comprises a laser, the modulator of FIGS. 7a and 7b and a photodetector. This link has a gain over a large frequency bandwidth when the RF wave and the optical wave co-propagate as shown in FIG. 8 graph (b). For this modulator, the modulation frequency can be much higher than the inverse of twice the group delay of the light transmitted through the 5-cm long grating waveguide. The RF link gain is obtained for a fairly large range of laser wavelengths between 1559.35 nm and 1559.40 nm. The optical transmission spectrum of the modulator at these wavelengths is shown in FIG. 8 graph (a). These results for a modulator with a single grating indicate that for a modulator with multiple gratings, those multiple gratings can have the same grating design (i.e., the same effective refractive index step and the same pitch of the periodic variation in index) and can still be operated at different laser wavelengths. Alternatively, for operation at laser wavelengths that are spaced farther apart, the multiple gratings in a modulator could have different grating designs (with slightly different periods of their refractive index perturbation) to optimize the RF link gain obtained for each laser wavelength separately.

The light propagating in the grating can be considered as having a group velocity. That group velocity depends on the effective refractive index step at the many interfaces of the grating, the wavelength of the light, the length of the waveguide portion between grating interfaces, and the nominal refractive index of that waveguide portion. The overall group delay of the transmitted light output from the grating becomes larger and larger as the grating is made longer and longer. However, the group velocity, which is equal to the overall grating length divided by the group delay, can remain approximately the same when the wavelength of the light is adjusted to obtain the same amount of total transmission through the grating. Thus, one can change the group velocity of the light by changing the laser wavelength, changing the index difference of the grating or changing the period of the grating.

Figure 10:
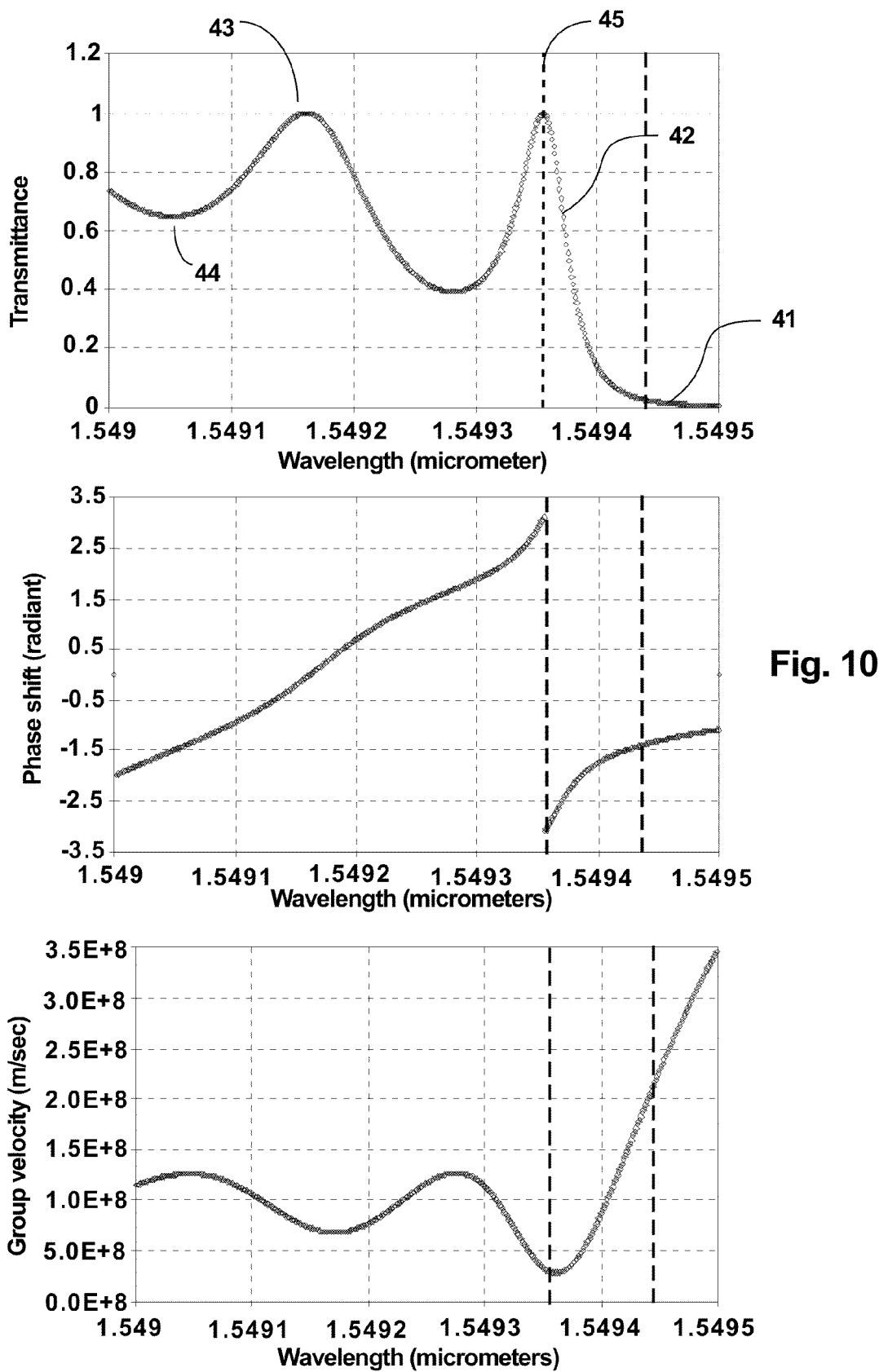
FIG. 10 depicts the calculated transmittance for an optical grating, the phase shift of the transmitted light and the group velocity of the light transmitted through the optical grating.

The group velocity of light at a given optical-carrier frequency (laser frequency) can be determined from a calculation or measurement of the phase spectrum of the light transmitted through the grating. FIG. 10 shows an example of the transmittance spectrum of an ideal grating, the phase shift of the transmitted light and the group velocity of that transmitted light. The group delay can be calculated from the phase shift spectrum and the group velocity can be calculated from the group delay and the grating length. Note that the group velocity at the optical carrier frequency (or optical wavelength), which is chosen to coincide with some point along the steep slope 42 of the transmittance notch 41 of the grating, can be several times slower than the group velocity at optical frequencies or wavelengths far away from that notch 41. Thus, for a material like lithium niobate, the grating is an effective means to slow the velocity of the light to match more closely the velocity of the propagating RF field.

When the group velocity of the traveling RF field is not matched to the group velocity of the light traveling through the waveguide grating, the amount of modulation of the output light is reduced. Thus, it is desirable (but not required) that the RF group velocity be matched (i.e., be identical) to the optical group velocity. For example, for a given length of grating, if the difference between propagation time delays of the RF field 8 and the grating-transmitted light become greater than one half of the period of the RF waveform, the modulation attained in one portion along the longitudinal axis of the grating will cancel the modulation obtained in another portion along the longitudinal axis of the grating. This walk-off or departure from phase alignment between the propagating RF field and the grating transmitted light constrains the maximum tolerable mismatch between their group velocities and the maximum frequency of the RF signal 8 needed to limit the reduction in the amount of modulation of the output light to some desired value (the amount of reduction may, in fact, be zero, and is preferably less than 3 db). It is notable that, at specific frequencies of the RF signal 8, the cancellation arising from this walk-off in phase alignment can be nearly complete and the transmitted light output can have no net modulation.

The RF waveguide or transmission line is preferably designed such that the velocity of the EM field propagating through the portion of the RF waveguide or transmission line containing that portion of the grating is the same as the group velocity of the light propagating in that portion of the grating. This may be accomplished by various known means such as by adjusting the thickness of the dielectric spacer (the cladding layer 20) between the EO material in the optical grating waveguide 14 and the metal electrodes 12-1 and 12-1 of FIG. 3b. This also may be accomplished by adjusting the heights of the electrodes 34, and by adjusting the gap between elements 32 and 34 of FIGS. 7a and 7b. Examples of design curves for velocity matched CPS and CPW transmission line electrodes are provide in "Design of Ultra Broad-Band LiNbO$_3$ Optical Modulators with Ridge Structure" by O. Mitomi, et al. (*IEEE Transactions on Microwave Theory and Techniques*, vol. 43, no. 9, September 1995, p. 2203), which is hereby incorporated by reference herein. Note that since the grating reduces the group velocity of the light propagating through a grating waveguide (and essentially increases the equivalent or apparent optical refractive index), the buffer between the metal electrode and the LiNbO$_3$ waveguide can be thinner, the metal electrode thickness can be smaller and the gap in the CPW or CPS transmission line can be smaller. This can result in an improved match of the electrode impedance to 50 ohms and a lower full-modulation voltage ($V_\pi$).

Being able to reduce the group velocity of the light makes it easier to achieve group velocity matching in EO materials such as lithium niobate for which the optical refractive index is several times smaller than the RF refractive index. With velocity matching, the grating can be made longer to permit a weaker RF signal to achieve the same degree of modulation of the light. The grating can be designed to reduce the group velocity of light at a band of wavelengths near the operating wavelength to be approximately the same as the velocity of the RF EM field. This can be done using optical simulation (such as those illustrated by FIG. 10) to develop design curves that relate the optical group velocity for a given wavelength of light and the various parameters defining the grating, such as its index difference, period and length.

Figure 9:
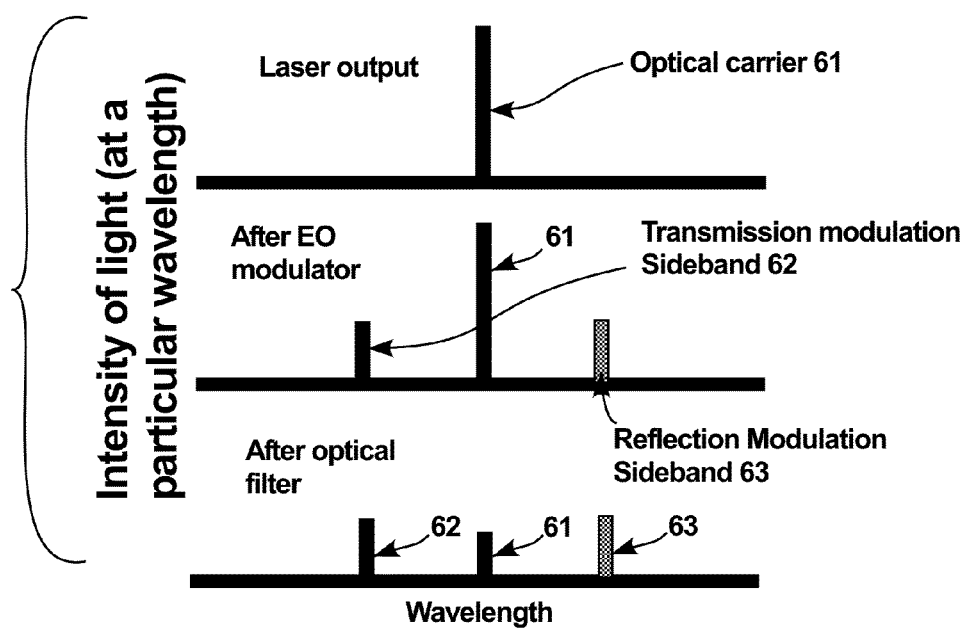
FIG. 9 depicts the spectral components of the light input to the grating modulator, the light transmitted through or reflected from the grating modulator, and the light output from the optical filter of the link shown in FIG. 6.

Light whose intensity modulation has been controlled by an RF signal can be described as comprising an optical-carrier frequency component 61 and modulation-sideband components 62, 63 that are at frequencies somewhat higher (shorter wavelength) or lower (longer wavelength) than the optical carrier frequency as illustrated in FIG. 9. The frequency spacing between the optical carrier 61 and the modulation sideband 62, 63 is equal to the frequency of the RF signal. As the light propagates through the optical grating waveguide, more and more power that was at the optical-carrier frequency component 61 is transferred into the frequency components of that light at the modulation sidebands 62, 63.

It is to be noted each modulation sideband 62, 63 contains primarily a narrow bandwidth of light that is propagated through the optical grating waveguide, as limited by the dispersion of that grating. For example, if a short (e.g. 50 psec. wide) optical pulse comprising many and wide-ranging optical frequencies (e.g., >40 GHz) is propagated through that grating, the width of the pulse would spread because of the dispersion of the grating. This optical-pulse spreading is illustrated in FIGS. 11a and 11b. To avoid a related pulse spreading effect of the modulation, one may need to limit the bandwidth of the RF signal that can be used to modulate the disclosed modulator. Also, one can judiciously select and match the transmittance spectrum of the grating to the laser wavelength and the modulation frequency, as discussed next.

In a preferred embodiment (referring to FIGS. 9 and 10), the wavelength 61 of the light input to the grating modulator coincides with a point on the edge 42 of a main transmittance notch 41 in the grating's characteristic transmittance spectrum as illustrated in FIG. 10 and FIG. 8 graph (a). Some modulation sidebands of the light coincide with the transmittance notch 41. In the preferred embodiment, other modulation sidebands of the light preferably coincide with wavelengths for which the grating transmittance is constant.

Consider, first, the modulation sidebands 63 (illustrated in light grey in FIG. 9) having a wavelength that coincides with a portion of the main transmission notch 41. That optical energy is reflected by the grating and exits the waveguide grating from the same input port though which the laser light is supplied to the grating rather than being transmitted through the grating.

Consider, next, the modulation sideband 62 (illustrated in black in FIG. 9) whose wavelength preferably coincides with a satellite peak 43 in the transmittance spectrum. Light once transferred into that sideband is not further modulated by the shifts in the transmittance as the light in that sideband propagates through the grating to the transmitted output. Since only the light in the optical carrier wavelength 61 is modulated, only the group velocity of that wavelength component is of major concern for the velocity matching.

As an also acceptable alternative, the wavelength of the modulation side band 62 could coincide with a satellite valley 44 in the transmittance spectrum. FIG. 10 shows that for wavelengths near these satellite or local transmittance peaks 43 or transmittance valleys 44, the group velocity is approximately constant. If the modulation sideband 62 coincides with a local transmittance peak 43 or with a transmittance valley 44, the group velocity of those frequency components in that sideband 62 can be approximately the same. In that case, there would be minimal broadening of a pulsed RF modulation signal. However, if the modulation sideband 62 coincides with some portion of the spectrum where the transmittance varies with wavelength (or frequency), there will be some dispersion of the various frequency components of the modulated signal.

The components of the light at the optical-carrier 61 and at the modulation sidebands (e.g., 62) can have different values for their group velocity. In a typical RF-photonic (or microwave photonic) link, the modulated light illuminates a photodetector. The photodetector can be thought of as multiplying the optical-frequency carrier with the optical-frequency modulation sideband to generate an electrical RF output signal. Although the components of the light at the optical-carrier and at the optical modulation sideband have different group velocities, the light at the optical-carrier will still be phase-tracked with (although not having an identical phase as) light at the modulation sideband if the inverse linewidth of the laser is shorter than the group delay through the grating modulator.

Incidentally, as shown in FIG. 10, if the wavelength of the optical frequency carrier 61 is close to, albeit not exactly coinciding with, the first local peak 45 in the grating transmittance spectrum, the group velocity for that optical frequency carrier 61 also can remain approximately constant as the grating is modulated.

FIG. 8 graphs (a) and (b) also show that the wavelength of the light being modulated is preferably close to the region of the spectral notch having high transmission rather than having low transmission (or high reflection). As shown in FIG. 8, there is a large change in transmission with wavelength (dT/dX) for this wavelength of the light. In contrast, the prior Fabry-Perot cascade modulators with traveling-wave electrode have the wavelength of the laser light coincide with the bottom of the spectral notch. For the prior art modulators, the goal is to delay the propagating light as much as possible with a minimal change in the transmitted intensity of that light and minimal change of the transmission with the wavelength of the light.

It should be understood that the above-described embodiments are merely some possible examples of implementations of the presently disclosed technology, set forth for a clearer understanding of the principles of this disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:

1. An optical modulator structure comprising:
   an RF waveguide having a first longitudinal axis; and
   at least one optical grating waveguide having a second longitudinal axis located within the RF waveguide, the first longitudinal axis being parallel with and substantially coincident with the second longitudinal axis such that, in use, an RF field propagating in the RF waveguide and an optical field propagating in the optical grating waveguide propagate in substantially parallel directions, the at least one optical grating waveguide having a grating adapted to provide a notch in a transmission spectrum for the optical field propagating in the optical grating waveguide and having an operating wavelength of the optical field propagating in the optical grating waveguide wherein the operating wavelength is selected to occur at a transition from a substantially maximum transmission to greater than minimum transmission in said optical grating waveguide, the optical field propagating, in use, in the optical grating waveguide having an optical group velocity at the operating wavelength;
   wherein the RF field propagating, in use, in the RF waveguide has a RF group velocity sufficiently equal to the optical group velocity to obtain a desired amount of amplitude modulation of the optical field propagating in the optical grating waveguide by said optical modulator.

2. The optical modulator structure of claim 1 wherein the grating of the at least one optical grating waveguide has a single uniform grating period and is longitudinally continuous.

3. The optical modulator structure of claim 2 wherein the grating of the at least one optical grating waveguide has a characteristic refractive index difference and wherein the refractive index difference and the grating period are selected to minimize a difference between the optical group velocity and the RF group velocity.

4. The optical modulator structure of claim 1 wherein the RF group velocity defines a characteristic time period and wherein the grating of the at least one optical grating waveguide has a length that is greater than one-half the characteristic time period multiplied by the optical group velocity.

5. The optical modulator structure of claim 1 wherein the RF waveguide has electrically conductive electrodes on opposing exterior surfaces, the electrically conductive electrodes being spaced from the optical grating waveguide by cladding layers.

6. The optical modulator structure of claim 5 wherein a thickness of at least one of the cladding layers and/or a thickness of the electrically conductive electrodes are selected to minimize a difference between the optical group velocity and the RF group velocity.

7. The optical modulator structure of claim 1 wherein the RF waveguide has electrically conductive electrodes on the same exterior surface, the electrically conductive electrodes being spaced from the optical grating waveguide by a buffer layer.

8. The optical modulator structure of claim 7 wherein a thickness of the buffer layer and/or a thickness of the electrically conductive electrodes are selected to minimize a group velocity mismatch between a group velocity of the RF field traveling, in use, in the RF waveguide and a group velocity of the light or optical field traveling, in use, through the optical grating waveguide.

9. The optical modulator structure of claim 1 wherein the optical field propagating in the optical grating waveguide has a characteristic wavelength and the characteristic wavelength is selected to minimize a group velocity mismatch between a group velocity of the RF field traveling, in use, in the RF waveguide and a group velocity of the light or optical field traveling, in use, through the optical grating waveguide.

10. The optical modulator of claim 1 comprising at least two optical grating waveguides located inside the RF waveguide in a side by side orientation with each having a light receiving end coupled to a different light frequency source.

11. The optical modulator of claim 10 wherein each of the optical grating waveguides have a grating formed therein wherein the gratings formed in different ones of the at least two optical grating waveguides have different grating periods, and wherein the grating periods are selected to minimize a difference between the RF group velocity and an optical group velocity of a first one of the at least two optical grating waveguides and minimize a difference between the RF group velocity and an optical group velocity of a second one of the at least two optical grating waveguides.

12. The optical modulator structure of claim 1 comprising at least two optical grating waveguides located inside the RF waveguide, each of the optical grating waveguides has a grating formed therein wherein the grating formed in a first optical grating waveguide of the at least two optical grating waveguides has a first characteristic index difference and the grating formed in a second optical grating waveguide of the at least two optical grating waveguides has a second characteristic index difference, wherein the first index difference and the second index difference are not equal and are selected to minimize a difference between the RF group velocity and an optical group velocity of the first optical grating waveguide and minimize a difference between the RF group velocity and an optical group velocity of the second optical grating waveguide.

13. The optical modulator structure of claim 1 wherein the operating wavelength of the optical field propagating in the optical grating waveguide is aligned, in use, to be on one of two edges of said notch in the grating transmittance spectrum.

14. The optical modulator of claim 1 wherein the at least one optical grating waveguide has a single grating so that the at last one optical grating waveguide provides a single notch in the transmission spectrum for the optical field propagating in the at least one optical grating waveguide.

15. An optical modulator structure comprising:
a substrate; and
at least one optical grating waveguide formed of an electro-optic material, the at least one optical grating waveguide having a first longitudinal axis disposed within the substrate and an RF waveguide having a second longitudinal axis disposed on the substrate, the first longitudinal axis being parallel with and substantially coincident with the second longitudinal axis such that, in use, an electric field propagating in the RF waveguide and an optical field propagating in the at least one optical grating waveguide propagate in substantially parallel directions, wherein the at least one optical grating waveguide includes a grating adapted to provide a notch for the optical field propagating, in use, in the optical grating waveguide and the at least one optical grating waveguide having an operating wavelength wherein the operating wavelength is selected to occur at a transition from substantially maximum transmission to greater than minimum transmission, so that as the electro-optic material of the at least one optical grating waveguide reacts to the electric field propagating in the RF waveguide, its transmission spectrum changes in response thereto resulting in amplitude modulation of the optical field propagating, in use, in the at least one optical grating waveguide.

16. The optical modulator of claim 15 wherein the RF waveguide has electrically conductive electrodes on the same exterior surface of the substrate, the electrically conductive electrodes being spaced from the optical grating waveguide by a buffer layer.

17. The optical modulator structure of claim 16 wherein the optical field propagating, in use, in the at least one optical grating waveguide has an optical group velocity at the operating wavelength, wherein the RF field propagating, in use, in the RF waveguide has a RF group velocity, and wherein a thickness of the buffer layer and a thickness of the electrically conductive electrodes are selected to minimize the difference between the optical group velocity and the RF group velocity.

18. The optical modulator of claim 15 where the RF waveguide is a Transverse Electromagnetic RF waveguide comprising a first electrode and a second electrode;
wherein the first electrode and second electrode are disposed on opposite sides of the optical grating waveguide.

19. The optical modulator structure of claim 15 wherein the operating wavelength of the optical field propagating in the at least one optical grating waveguide is aligned, in use, to be on one of two edges of said notch in the grating transmittance spectrum.

20. An RF photonic transmitter comprising:
an RF waveguide formed at least in part of an electro-optic material, the RF waveguide having a first end and a first longitudinal axis and at least one optical grating waveguide with a second end and a second longitudinal axis, wherein the first end is coincident with the second end and the first longitudinal axis is parallel with and substantially coincident with the second longitudinal axis such that an RF field propagating in the RF waveguide overlaps the optical grating waveguide, the optical grating waveguide having a grating adapted to provide a notch in a transmission spectrum of an optical field propagating in the at least one optical grating waveguide and wherein the optical field has an operating wavelength, the operating wavelength being selected to occur at a transition from substantially maximum transmission to greater than minimum transmission;
for each of the at least one optical grating waveguide, an associated laser emitting laser light at the operating wavelength of the at least one optical grating waveguide with which it is associated, the laser light of the associated laser entering its associated optical grating waveguide at the second end and being amplitude modulated as an edge of the notch in the transmission spectrum of the optical field propagating in the associated optical grating waveguide shifts frequency in response to a changing refractive index of said electro-optic material; and
wherein the RF waveguide is adapted to receive an RF signal at the first end for changing the refractive index of said electro-optic material.

21. The RF photonic transmitter of claim 20 wherein the at least one optical grating waveguide has an optical group velocity at the operating wavelength of the at least one optical grating waveguide; and wherein the RF waveguide is adapted to have a RF group velocity sufficiently equal to the optical group velocity of the at least one optical grating waveguide to obtain a desired amount of said amplitude modulation.

22. The RF photonic transmitter of claim 20 where the RF waveguide is a Transverse Electromagnetic RF waveguide comprising a first electrode and a second electrode;
wherein the first electrode and second electrode are disposed on opposite sides of the optical grating waveguide.

23. The RF photonic transmitter of claim 20 where the RF waveguide comprises a first electrode on the surface of the substrate over the optical waveguide and a second electrode disposed to either side of the optical waveguide.

24. The RF photonic transmitter of claim 20 comprising at least two optical grating waveguides located inside the RF waveguide, each of the optical grating waveguides having a grating formed therein and wherein the gratings which are formed in different ones of the at least two optical waveguides have the same grating period.

25. The RF photonic transmitter of claim 24 wherein the optical field propagating in a first optical grating waveguide of the at least two optical grating waveguides has a first characteristic wavelength and the optical field propagating in a second optical grating waveguide of the at least two optical waveguides has a second characteristic wavelength, wherein the first characteristic wavelength and the second characteristic wavelength are selected to minimize the difference between the RF group velocity and the optical group velocity of the first optical grating waveguide and minimize the difference between the RF group velocity and the optical group velocity of the second optical grating waveguide.

26. The RF photonic transmitter of claim 20 wherein a RF signal is applied to the RF waveguide and propagated by the RF waveguide, and wherein the RF signal has a characteristic frequency, wherein the laser-emitted light has a frequency, and wherein the characteristic frequency of the RF signal is equal to the difference between the frequency of the laser-emitted light and the frequency of a portion of the notch in the transmittance spectrum.

27. The RF photonic transmitter of claim 20, wherein the transmittance spectrum of said at least one optical grating waveguide has a local transmittance peak or a local transmittance valley, and wherein the characteristic frequency of the RF signal is approximately equal to the difference between the frequency of the laser-emitted light and the frequency of the local transmittance peak or the frequency of the local transmittance valley.

28. The RF photonic transmitter of claim 20, wherein the at least one optical grating waveguide includes a first and a second optical grating waveguide disposed parallel to each other, and wherein the laser emitting light into the first optical grating waveguide is a first laser that emits light of a first wavelength and the laser emitting light into the second optical grating waveguide is a second laser that emits light of a second wavelength, and wherein the first wavelength and the second wavelength are different.

29. The RF photonic transmitter of claim 28, wherein the first wavelength and the second wavelength are selected to minimize a group velocity mismatch between a group velocity of the RF field traveling, in use, in the RF waveguide and a group velocity of the light traveling, in use, through the first optical grating waveguide and a group velocity of the light traveling, in use, through the second optical grating waveguide.

30. The RF photonic transmitter of claim 28, wherein the light propagating in the first optical grating waveguide exits said first optical grating waveguide and the light propagating in the second optical grating waveguide exits said second optical grating waveguide, and wherein the light exiting from the first optical grating waveguide and the light exited from the second optical grating waveguide are coupled to a photodetector.

31. The RF photonic transmitter of claim 20 wherein the operating wavelength of the optical field propagating in the at least one optical grating waveguide is aligned, in use, to be on one of two edges of said notch in the grating transmittance spectrum.

32. A method of modulating the intensity of an optical field propagating in an optical modulator structure with an RF field, the optical modulator structure including: an RF waveguide for propagating said RF field, the RF waveguide having a first longitudinal axis; and at least one optical grating waveguide having a second longitudinal axis located within the RF waveguide, the first longitudinal axis being parallel with and substantially coincident with the second longitudinal axis such that the RF field propagating in the RF waveguide and an optical field propagating in the optical grating waveguide propagate in substantially parallel directions, the at least one optical grating waveguide having a grating adapted to provide a notch in a transmission spectrum for the optical field propagating in the optical grating waveguide and having an operating wavelength of the optical field propagating in the optical grating waveguide wherein the operating wavelength is selected to occur at a transition from a substantially maximum transmission to greater than minimum transmission in said optical grating waveguide, the optical field propagating in the optical grating waveguide having an optical group velocity at the operating wavelength;

wherein the RF field propagating in the RF waveguide has a RF group velocity sufficiently equal to the optical group velocity to obtain a desired amount of amplitude modulation of the optical field.

33. The method of claim 32 wherein the optical field propagating in the optical grating waveguide has a characteristic wavelength and the characteristic wavelength is selected to minimize a group velocity mismatch between a group velocity of the RF field propagating in the RF waveguide and a group velocity of the optical field traveling through the optical grating waveguide.

34. The method of claim 33 wherein said at least one optical grating waveguide comprises a plurality of optical grating waveguides disposed with elongate axes thereof disposed parallel each other and disposed on a common substrate.

35. The method of claim 34 wherein each of the plurality of optical grating waveguides has an optical field propagating therein, the optical field of each of the plurality of optical grating waveguides corresponding to a different optical carrier frequency.

* * * * *